Dec. 10, 1968 D. P. COOPER, JR., ET AL 3,415,945

DELAY-LINE CONTROLLED COLOR TELEVISION

Filed Dec. 27, 1965 4 Sheets-Sheet 1

INVENTORS.
DEXTER P. COOPER, JR.
SHOLLY KAGAN
BY Brown and Mikulka
and
James E. Mrose
ATTORNEYS

DELAY-LINE CONTROLLED COLOR TELEVISION

Filed Dec. 27, 1965 4 Sheets-Sheet 2

INVENTORS
DEXTER P. COOPER, JR.
SHOLLY KAGAN

BY Brown and Mikulka
and
James E. Mrose
ATTORNEYS

DELAY-LINE CONTROLLED COLOR TELEVISION

Filed Dec. 27, 1965 4 Sheets-Sheet 3

INVENTORS
DEXTER P. COOPER, JR.
SHOLLY KAGAN
BY Brown and Mikulka
and
James E. Mrose
ATTORNEYS INVENTORS
DEXTER P. COOPER, JR.
SHOLLY KAGAN
BY
Brown and Mikulka
and
James E. Mrose
ATTORNEYS

United States Patent Office 3,415,945
Patented Dec. 10, 1968

3,415,945
DELAY-LINE CONTROLLED COLOR TELEVISION

Dexter P. Cooper, Jr., Lexington, and Sholly Kagan, Natick, Mass., assignors to Polaroid Corporation, Cambridge, Mass., a corporation of Delaware Filed Dec. 27, 1965, Ser. No. 516,491
16 Claims. (Cl. 178—5.4)

ABSTRACT OF THE DISCLOSURE

The target assembly in the cathode ray tube of a color television receiver includes phosphors selectively excited to emit light of different colors as a result of the impingement thereon of electrons having different kinetic energies. To change the kinetic energies of the electrons impinging on the target assembly, a plurality of vertically arranged and electrically conductive parallel strips is disposed adjacent the target assembly extending at right angles to the direction of the horizontally scanning electron beam. The different strips are connected to different portions of a multi-tab delay line which is supplied with a pulse of an accelerating voltage at the beginning of a line scan to cause a pulse of accelerating potentials to sweep across the target assembly synchronously with the scanning of the target assembly by the electrons.

The present invention relates to improvements in electronic production of displays in color, and, in one particular aspect, to novel and improved two-color television apparatus of uncomplicated construction wherein variations in the electron velocities controlling visible emissions from different phosphor materials are scanned via a delay line.

The theoretical possibilities of developing three-color kinescopes in which distinctive color emissions from phosphors are responsive to electron velocity are of course well known; however, there are formidable problems associated with the high power requirements which must be satisfied, with the need for controlled variations in scanning signals, and with high-speed switching of high accelerating potentials and such problems have impaired practical exploitation of these concepts. In conformity with classical theories relating to color and its perception, electronic reproduction of subjects in color have proceeded on the basis that the subject should first be resolved in terms of three primary-color components and that all of the components should then be recombined after a transmission to a remote site; in turn, this has led to proposals that electron-velocity modulations in a three-color receiving tube might be practiced using complex three-layer screens and triple modulations of kinetic energy of electron beams. According to certain aspects of the present teachings, significant simplification of kinescope construction results from the use of two, rather than three, phosphors capable of emitting light of different wavelengths, although substantially full natural color is nevertheless developed as the result of conversions which recognize that colors perceived in the field of an image are dependent upon the interplay of its longer and shorter wavelengths, without limitation to those specific wavelengths of the Newtonian spectrum with which colors are classically identified. This simplification would not, per se, circumvent all of the difficulties associated with electron-velocity modulation, however, and, in particular, the rapid switching of high voltages at large power ratings over a broad-area raster tends to be especially troublesome. The present invention overcomes this limitation in that it requires modulation of beam-accelerating potentials only within one of relatively few and small discrete areas near the face of a receiver tube at any instant, the modulating potentials being synchronously applied over successive ones of such areas in accordance with the dictates of a simple form of delay line into which modulating pulses are injected and caused to travel at line-scanning velocities. Reproduction in substantially natural color can thus be advantageously realized using layered phosphors and a single electron gun, without involving a dot or line pattern of phosphors on the screen or requiring provisions for precise registration of the beam with phosphor elements, as is usually the case.

It is one of the objects of the present invention, therefore, to provide improvements in and simplification of color television in which color displays are responsive to electron velocity modulations occasioned in the vicinity of relatively small and descrete areas near a picture tube target.

Another object is to provide novel and improved color television apparatus wherein emissions of relatively longer and shorter wavelengths or bands of wavelengths of light are stimulated selectively by changes in electron-accelerating potentials, the locus of changed accelerating potential being scanned across the target area of a picture tube under control of tapped outputs from a delay line.

A further object is to provide substantially natural-color television receiver apparatus of low-cost construction involving but two different phosphors deposited in layer form, the phosphors being selectably stimulated to emit light of different wavelengths in response to electron-velocity modulations produced with the expenditure of only relatively low power.

By way of a summary account of practice of this invention in one of its aspects, the scenes viewed by camera equipment of a television transmitter unit are translated into two separate images through different optical filters, such as substantially red and green filters, and each of these images in turn excites the sensitive screen of a different image orthicon tube to produce characterizing electrical output signals. At a receiving site, the characterizing electrical output signals are duplicated for purposes of controlling the intensities of an electron beam which scans a screen target assembly disposed near the face of a picture tube, and, in conformity with one technique for scanning, each of the color-coded signals derived from the two camera tubes is applied in control of the intensity of an electron beam during certain intervals of its horizontal line are caused to be intensity-modulated in accordance with the light values along a corresponding strip of the scene as viewed through a different filter by a different one of the camera pickup tubes. One suitable construction of the cooperating picture tube target or faceplate involves two superposed phosphor screen coatings, preferably separated by a layer of material capable of retarding velocities of electrons passing through it, and a very thin multi-strip metallic anode atop but insulated from the inner screen coating nearer the electron gun, the anode being in the form of a plurality (example: twenty) of closely-spaced vertically-disposed thin metallic strips of substantial width (example: of the order of one inch). The phosphor layers are divided into corresponding spaced strips also. In one example, the innermore phosphor layer, nearer the electron gun, may comprise a phosphor which emits substantially red light when stimulated by impinging electrons having at least a predetermined minimum kinetic energy insured by a grid-like accelerating anode disposed in closely-spaced relationship to the target, inwardly of the multi-strip anode. The other thin phosphor coating in this example, nearer the transparent tube face, is transparent and comprises a phosphor which emits a non-red, preferably green-blue, light only when stimulated by electrons having at least the same kinetic energy. While a high unvarying potential applied to an inner accelerating anode suffices to stimulate emissions from the inner phosphor layer, the outer phosphor layer does not emit visible light unless a still further accelerating voltage is added. The latter is done by applying a high voltage only to each of the strips of the multi-strip anode which is in the proper locus to accelerate the electron beam further during certain discrete times within its horizontal scanning interval when the outer phosphor is to emit its distinctive color of light. During each such alternate horizontal scan of substantially one line by the electron beam, the vertical anode strips are synchronously pulsed with high voltage, in succession, to achieve the necessary added electron accelerations, this being done by way of a multi-section delay line to which a pulse is applied each time such an alternate scan of a line is ordered, with the pulse being tapped to a corresponding anode strip as it reaches each successive section of the delay line. A further conservation of power is achieved by feeding back to the delay line input the attenuated pulse leaving the delay line, after an additional time delay which takes into account the intervals between alternate scans.

The subject matter regarded as our invention is particularly pointed out and distinctly claimed in the concluding portion of this specification. However, both as to preferred structure and assembly, and further in relation to objects and advantages thereof, this invention may be best understood through reference to the following description taken in connection with the accompanying drawings, wherein:

Figure 1:
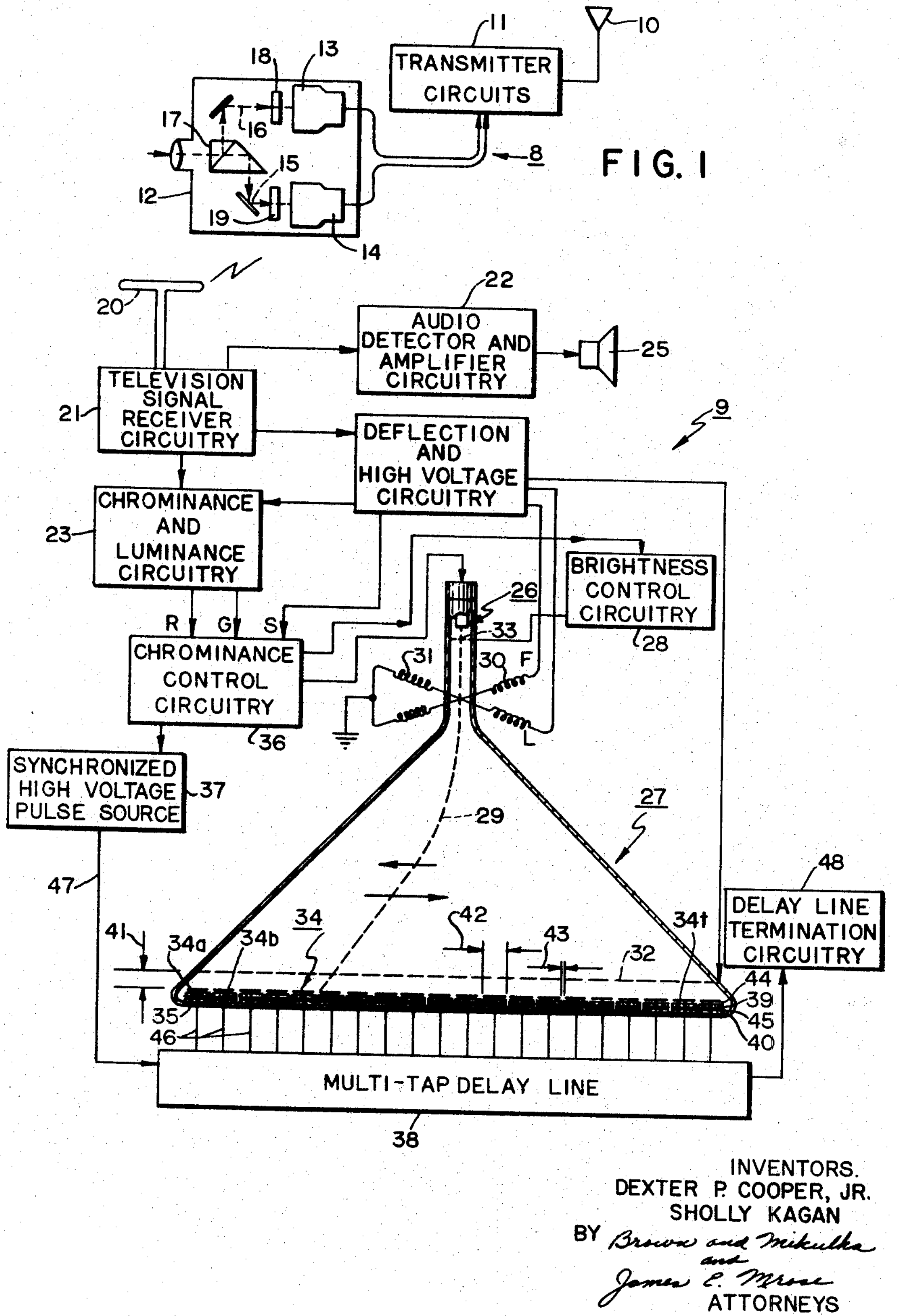
FIGURE 1 illustrates a full-color television system embodying certain of the present teachings, in part in block-diagram form and in part in schematic and pictorial form.
Figure 3:
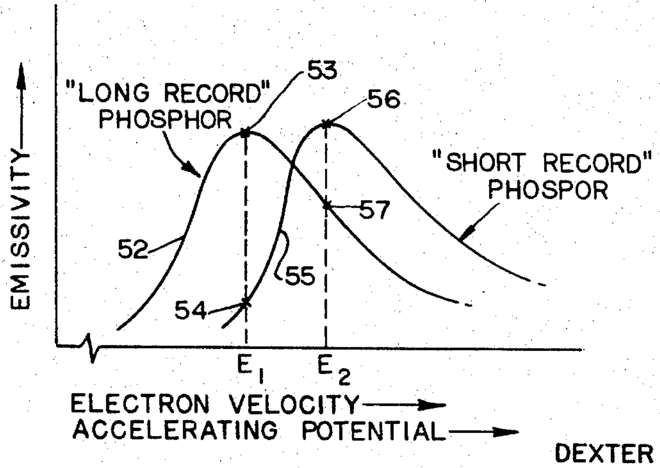
Figure 4:
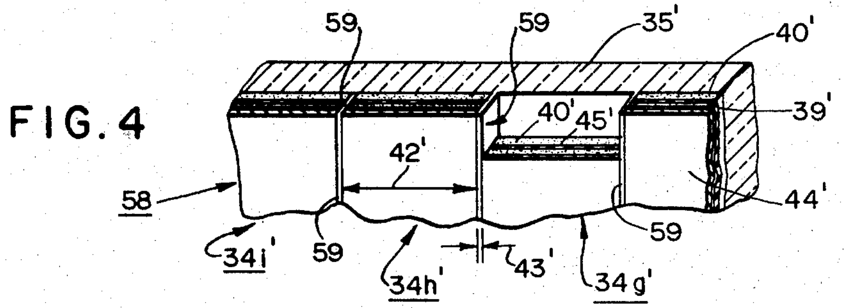
Figure 5:
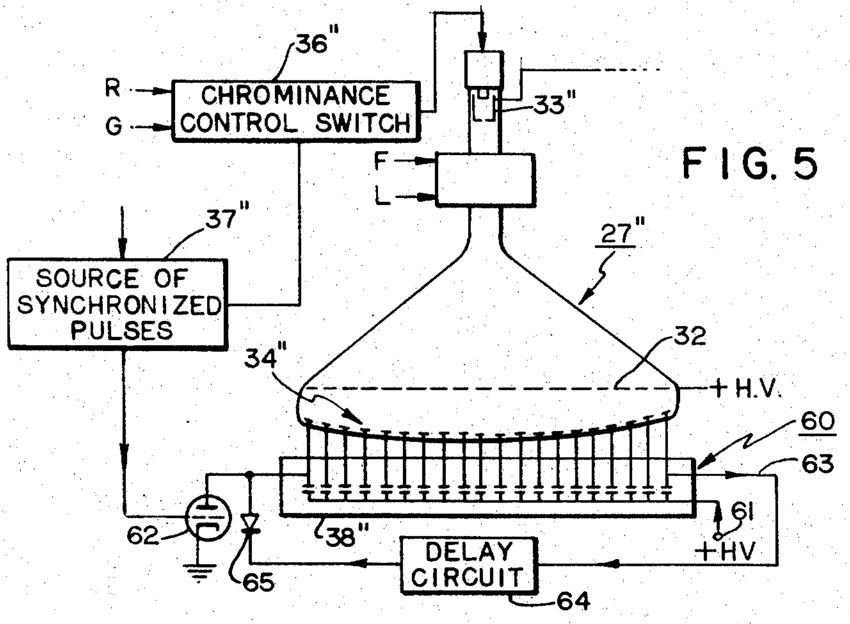
Figure 6:
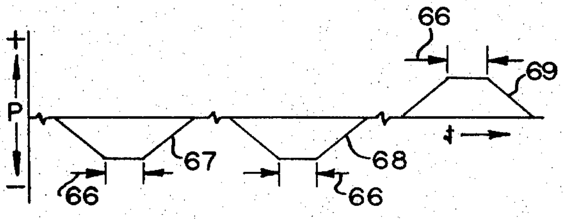
Figure 7:
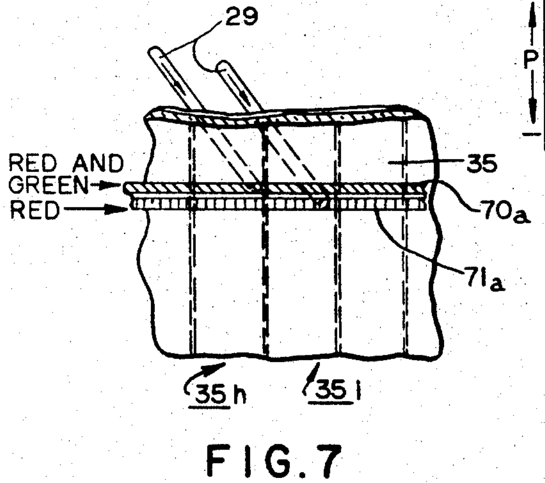
Figure 8:
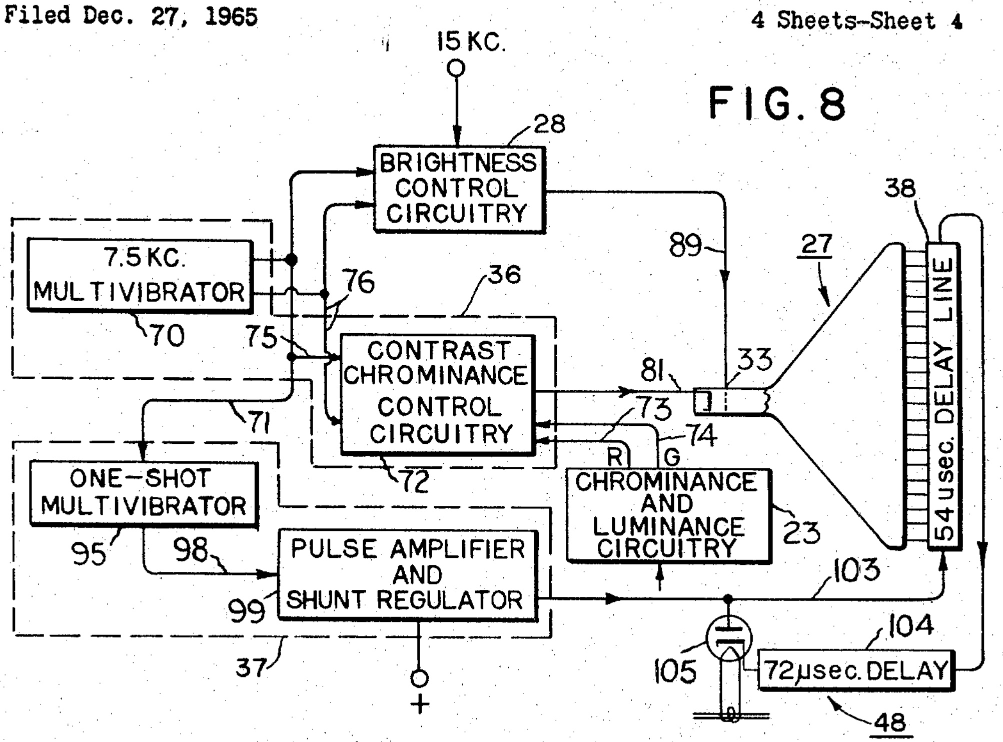
Figure 9:
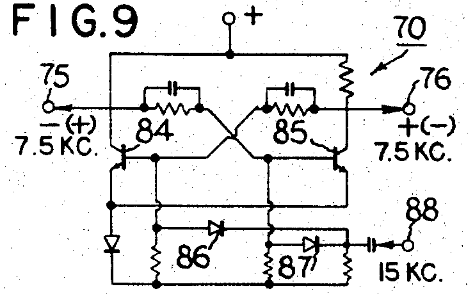
Figure 10:
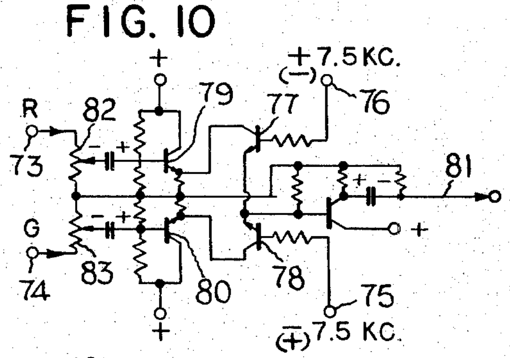
Figures 11, 12:
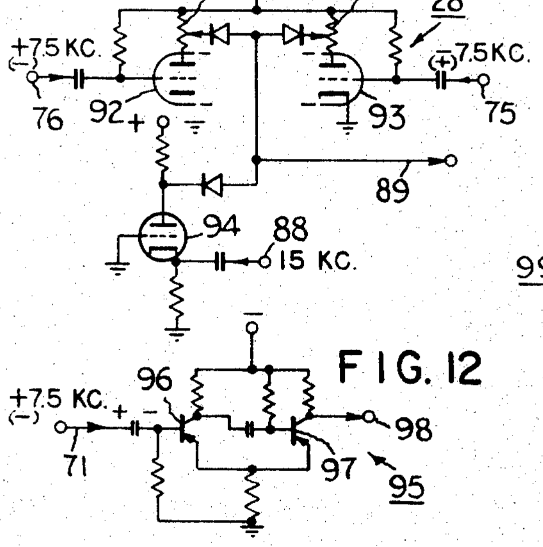
Figure 13:
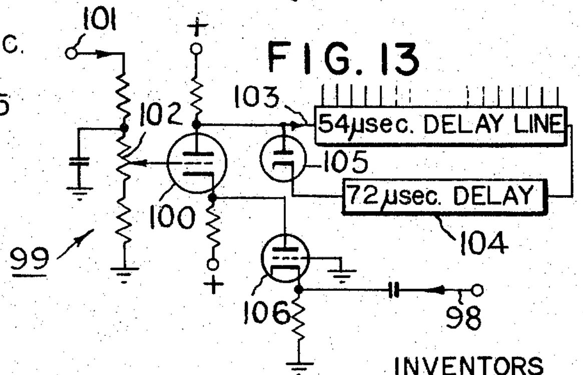

FIGURE 3 provides characteristic curves of phosphor emissivities related to the velocities of impinging electrons and, hence, to accelerating potentials in a picture tube;

FIGURE 4 represents a fragment of the faceplate of an improved color television picture tube;

FIGURE 5 illustrates part of a color television system wherein the delay-line control of acceleration potentials involves a feedback which reduces system power requirements;

FIGURE 6 is a graphical representation of preferred waveforms for pulses applied to delay-lines of the improved picture tubes;

FIGURE 7 provides a view from the front of a portion of the faceplate of a color television picture tube constructed and operated in accordance with the present teachings;

FIGURE 8 provides a diagram, in block and schematic conventions, of preferred embodiments of certain elements of the FIGURE 1 system;

FIGURE 9 illustrates a multivibrator circuit suitable for use as a square-wave source in the equipment of FIGURE 8;

FIGURE 10 illustrates a contrast control switch circuit useful in the equipment of FIGURE 8;

FIGURE 11 illustrates a brightness control circuit useful in the equipment of FIGURE 8;

FIGURE 12 illustrates a one-shot multivibrator useful in the equipment of FIGURE 8; and FIGURE 13 illustrates a pulse supply circuit useful in the equipment of FIGURE 8.

The arrangement portrayed in FIGURE 1 includes transmitter and receiver apparatus 8 and 9, respectively, which are in communication by way of electromagnetic radiations within a prescribed channel of television frequencies. Transmitting antenna 10 is excited by transmitter circuits 11 of conventional type which generate outputs modulated to contain the usual five requisite components (sound, video, deflection, chrominance and color burst) for the emitted color signal, the luminance and chrominance aspects of the televised scene being characterized in a camera assembly 12 which may include the usual three pickup tubes but includes at least a pair of pickup tubes, 13 and 14, such as image orthicon tubes electrically excited in the customary fashion. The scene viewed by camera 12 is optically resolved into at least two like image beams 15 and 16 by a lens, prism and mirror array 17, and, thereafter, each beam is passed through a different one of the two-color filters, 18 and 19 respectively, before being permitted to impinge upon the sensitive surfaces of its associated pickup tube. One of these filters, 18 passes essentially one color component in the scene, such as its red content falling within its reddish (relatively long) wavelengths of light in the Newtonian spectrum, while the other, 19, passes a specifically different color component corresponding, for example, to the greenish (relatively short) wavelengths. Two importantly different records, which may be termed a "long record" and a "short record," respectively, are thus projected upon and translated by the tubes. The pickup tube output signals, which become the system video signals, characterize the luminance, or brightness, of these projected records at each scanned position.

Within the receiver 9, the signals received from antenna 20 are applied to receiver circuitry 21 of a common type, and thence are resolved into their five principal components by the other block-diagrammed circuit units 22, 23 and 24, all of which may be of forms well known in commercial color television receivers. The audio components are translated in the detector and amplifier circuitry 22, for excitation of the speaker 25. Intensity of the electron beam 29 of a unique form of picture tube 27 is modulated in accordance with the detections by the two camera pickup tubes, by sequential video signals from the chrominance control circuitry 36 which is excited by the chrominance and luminance circuitry 23, and by pulsed brightness control circuitry 28, as is discussed in detail later herein. Deflection and high voltage circuitry 24 supplies the needed synchronized excitations for the field (F) and line (L) sweep windings 30 and 31, and, from its high voltage source, applies high accelerating potentials to a special second anode 32 of the picture tube, all in accordance with techniques and practices now well known in the art. Absenting any impression or modulation of color or chrominance information upon the electron beam, it is capable of tracing of a black-and-white reproduction of the televised scene upon the screen array provided for tube 27. However, for color reproduction in accordance with these teachings, there must also be modulation of the electron beam 29 in two respects: first, in intensity according to the proper chrominance information, by way of the electron gun structure, 26, 33 and, second, in velocity according to the color requirements, by way of modulated accelerating potentials applied to the screen array 34 near the tube face 35. Chrominance and luminance circuitry 23 may be of the type used in conventional color receiver circuitry, although only the outputs of two of the output channels need be exploited for a two-color system in accordance with one practice of the present teachings, these being the red (R) and green (G) channels as designated in FIGURE 1. Circuits 21, 22, 23 and 24 emphasize the extent to which a receiver embodying the present invention is compatible with conventional color receivers; it should be understood, for example, that the circuitry 23 will include the usual burst separator, gate pulse generator, burst-synchronized signal source and phase shifter, luminance amplifier and delay, chrominance filter and amplifier, and matrix demodulator. As is well appreciated in the art, the matrix demodulator outputs applied to the red (R) and green (G) channels respectively represent the red and green signal information, minus the associated luminance or brightness characteristics, in a scene televised through a camera having corresponding pickup tubes and filters. Because only two cameras are required in the illustrated embodiment, the television receiver circuitry may also be simplified appropriately for demodulation of only these two color signals, R and G.

Operation of the two-color system of FIGURE 1 is dependent upon electron-beam scanning of the screen array 34 in such a manner that only one, or another, or both, of two different light-emitting phosphors there will be stimulated into emission at predetermined places and times. The desired advantages will accrue when each horizontal sweep of beam 29 traces a full line of the scene in terms of one color only, with a second horizontal sweep by the same beam tracing the same full line of the scene in the other color of the two-color system, the two traces for each full-color line being adjacent, or contiguous, or superimposed. For these purposes, it is necessary that there be different accelerating voltages at the screen array 24 during the two different traces, and the control of color information controlled by the electron gun must also characterize a distinctive color during each of the two different traces. In the latter connection, the chrominance control circuitry 36 acts to pass either the red (R) or green (G) signal to the gun. Synchronizing signals (S) from the deflection circuitry 24 act to cause a selective switching or gating of either the R or G signals into the picture tube during the appropriate line-tracing intervals. Similarly, the high voltage pulse source 37 is synchronously operated in response to these signals (S), to deliver a pulse of high voltage to the multi-tapped delay line 38 each time light of a particular color content is to be emitted from the screen array during certain line-tracing intervals. The latter pulses occasion desired variations in accelerating potentials, in a manner described in greater detail hereinafter.

One convenient technique, whereby the required full-color reproduction can be attained without altering the now-conventional interlace scanning practices, involves the alternate interlaced scanning of one field in one color and the succeeding field of the frame in the other color (or colors). Adjacent lines, emitted in the different colors of light, are together witnessed by the observer as a substantially full-color horizontal strip in the completed picture, the adjacent interlaced lines being close enough to remain substantially indistinguishable from one another at normal viewing distances. One of these interlaced reproductions may be primarily in terms of the red light produced by visible emissions from an inner phosphor layer 39 in the screen array 34, while the other may be in terms of essentially white light produced by the combination of red light from layer 39 with green-blue light emitted simultaneously from an outer transparent phosphor layer 40, the latter being shown nearer the glass face 35 of the evacuated picture tube. The different emissions result from differences in kinetic energy of the electrons, as controlled by the delay line 38 in a unique modulation arrangement discussed further hereinafter. At this point, however, it is helpful to consider the color phenomena involved, and why the combinations of only reddish and whitish images traced by the electron beam can be made to yield substantially natural-color reproduction in a simple two-color system of the illustrated type. A theory which explains this is predicated upon a recognition that the eye may sense color without specific reference to wavelengths of colors as allocated in the Newtonian spectrum. It appears that it is not merely absolute wavelength, but the random interplay of longer and shorter wavelengths over a total image, which may account for full color, and it thus occurs that there are numerous combinations of two or more wavelengths or bands of wavelengths selected from the visible spectrum which will tend to develop such color. An important phenomenon for present purposes is that relatively long and short wavelengths of emitted light, which are not necessarily the same as the wavelengths of light from the original scene being televised, will nevertheless develop acceptable multiple colors for the reproduced scene. In the apparatus of FIGURE 1, for example, the red (long) and green (short) records presented to the camera pickup tubes 13 and 14, respectively, are reproduced on the screen array 34 of picture tube 27 in terms of reddish (long) and whitish (short) light to create the needed colors. The original records of a scene may be derived with reference to many possible paired combinations of wavelengths, of which the aforementioned red and green filtering provides but one example. Similarly, the reproductions may be in terms of a variety of paired combinations of wavelengths, such as a combination of light having wavelength from 550–590 millimicrons (long) and light having wavelengths up to 580 millimicrons (short) although separated from the long wavelength by 10–25 millimicrons, or light having wavelength of 550 or more millimicrons (long) and light having wavelength from 400–450 millimicrons (short), and others.

Modulation of the kinetic energy of the electron beam 29, to produce light emissions of the needed different wavelengths, is achieved by varying the accelerating potentials experienced by the beam once it has been appropriately deflected according to scanning needs in accordance with known practices. Accelerating anode 32, which is preferably a grid-like structure with numerous relatively large openings has a predetermined high accelerating voltage (ex. 15 kv.) impressed upon it and thus assures that the beam has substantially a predetermined velocity, such that it may be acted upon predictably by the fields from deflection coils 30 and 31. Beyond the locus of anode 32, however, the accelerating voltage may be either increased or decreased, depending upon what voltages are caused to appear at screen assembly 35 at various times. Separation 41 between the anode 32 and screen assembly may be only relatively small (such as one-half inch) and only a relatively low voltage differential need be developed between them to accomplish the desired changes in kinetic energy of the electron beam. Were it necessary to maintain the high voltage level on all of screen assembly 34 while each line or field is scanned for a particular color, the power requirements would of course be disadvantageously high and the associated switching problems would be quite severe. According to the present teachings however, the power and switching requirements may be kept very modest because only brief pulses of the high voltage need be applied periodically to the screen array. Each such pulse is applied, in sequence, to each of the separate vertical strips 34*a*–34*t* (twenty, in the illustrated construction) of which the screen array 34 is formed. Although the screen array as a whole appears to be a single layer-type screen, it is in fact comprised of the numerous spaced equal-width strips, all of which are parallel and extend vertically (i.e. in the same direction as the vertical sweep of the tube, and therefore transversely to the horizontal scan direction). In a typical construction, the width 42 of each strip may be about one inch, and the spacing 43 between adjacent strips about ten thousandths of an inch. The latter spacing affords a needed electrical isolation of each strip from its neighbors, the isolation being preserved also by the insulating glass face 35 to which the strips are applied. The objective of the multi-strip construction is of course to provide relatively small areas over which the high voltage pulses may be swept or scanned substantially in synchronism with the horizontal scanning by the electron beam, and this requires that an electrical connection be available with each strip independently of the others. In practice, the respective phosphor layers 39 and 40 in all the strips may be deposited at the same time, and then backed by a conductive and reflective layer 44 (such as the customary aluminum layer), the needed separations into strips being insured by masking, or by later scribing or the like. The illustrated construction also entails a filter or retardation layer 45, intermediate the phosphors 29 and 40, which may comprise a layer of a transparent material which will also reduce the kinetic energy of electrons, such as an evaporated silica layer.

Most common phosphors are somewhat conductive, electrically, and while connections may be made directly to these it is preferred to have the separate connections run directly to the conductive aluminum reflecting layer 44 on each strip as shown. The needed twenty connections, 46, are tapped from the twenty successive sections of tapped delay line 38, into which high voltage pulses are fed synchronously over input coupling 47 from pulse source 37. Each high voltage pulse appearing at the delay line input is first applied to strip 34*a*, while the electron beam 29 is being scanned horizontally across that strip; after a short delay, corresponding to the time required for the beam to traverse that one-inch width (about 2.7 microseconds, based upon a 54 microsecond horizontal line-scan interval), the pulse is next applied to the succeeding section of the delay line and to strip 34*b*; and so on until the electron beam completes the scan of a line and the voltage pulse reaches the last strip, 34*t*. Thereupon, the pulse must be taken from the line 38 in a manner avoiding reflections, and termination circuitry 48 represents a suitably matched load or the like for this purpose. The line may be terminated in an energy-dissipating load exhibiting its characteristic impedance, or, alternatively, in a further delay line which is useful in re-circulating the pulses to minimize power losses, as is described later herein and shown in FIGURES 5, 8 and 13.

Figure 2:
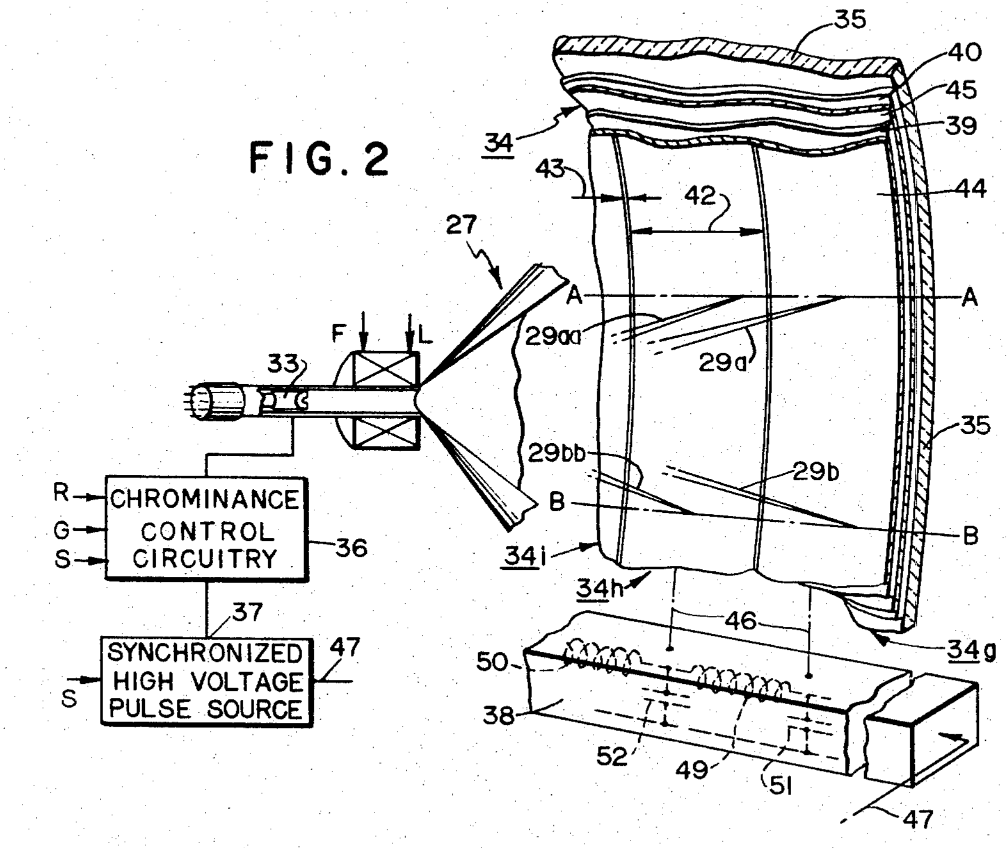
FIGURE 2 depicts a portion of the system of FIGURE 1, including a cut-away section of the neck assembly of an improved picture tube together with a relatively enlarged fragment of its faceplate assembly.

The portions of receiver and picture tube apparatus which are shown in FIGURE 2 correspond to those of the FIGURE 1 illustrations and are identified by the same reference characters. Faceplate 35 and screen array 34 appear only in fragmentary form, although in a convenient relative enlargement which aids understanding of that portion of the picture tube construction. Time displaced electron beam impingements along one horizontal level A—A are designated by reference characters 29*a* and 29*aa*, and those along a different horizontal level B—B by reference characters 29*b* and 29*bb*. As each horizontal line is traced, the reproductions of light are to be either by inner phosphor 39 alone, in which instance only the relatively low accelerating potential is required, or by both the inner and outer phosphors 39 and 40, such that the relatively high accelerating potential is required. Assuming that emission from only the inner phosphor is required during one horizontal line trace, a brief negative pulse may be applied to the input coupling 47 for the delay line 38, to lower the screen array potentials from a normally high level, and it will be successively dumped from one of its sections to the next, with each section in turn lowering the potential of the next-succeednig strip in the sequence (34*a*–34*t*). A preferred delay-line construction involves a series-inductance and shunt-capacitance network, a portion of which is shown in dashed linework and includes the inductances 49 and 50 and capacitors 51 and 52. Delay in each section of the line corresponds to about the time required for the electron beam to scan the horizontal distance 42, which is equal to the width of the target strips, such that the beam and pulse will travel substantially in synchronism during each horizontal scan. Preferably, the impedances in delay line 38 are tapered in values, to compensate for losses in power along the line and, thereby, to preserve the outputs at all of taps 46 substantially the same. The pulses applied to the delay line need not be perfectly square and, in fact, a flat-topped trapezoidal pulse form is preferred, with the top of the pulse having a duration about equal to the scanning time of the beam across one target strip. The latter pulse form insures that the voltage differentials across the small spaces 43 between strips will not be excessive and will not result in breakdowns. Synchronizing signals S cause the desired pulses to be delivered by source 37 to the delay line 38 in synchronism with the line scanning, and chrominance control circuitry 36 is similarly synchronized to gate either the red (long) or green (short) color signals to the picture tube grid 33.

Phosphor emissivity characteristics which are typical of those exploited in practice of this invention are presented graphically in FIGURE 3, wherein emissivity (visible emission due to fluorescence) increases along the ordinate, while electron velocity (hence, kinetic energy) of the electrons in a beam directed at the superposed phosphors in a picture tube screen array appears along the abscissa. The related accelerating potential is likewise represented along the abscissa. Curve 52 characterizes a long-record phosphor, such as the reddish phosphor layer 39 disposed innermore and nearer the electron gun structure, and this phosphor is shown to reach a peak and substantially optimum emissivity, at 53, when the impinging electrons have a relatively low velocity such as that developed by an accelerating potential $E_1$ in a given tube. Under the same conditions, the underlying outer phosphor 40 can develop no substantial light emission, as is evident from the locus of point 54 on response curve 55 for that phosphor. In the latter connection, it should be understood that the phosphor 39 (characterized by curve 52) is disposed in the path of the electron beam which impinges upon the outer phosphor 40, thereby retarding the velocity of electrons which reach the latter phosphor after first encountering the former. The same type of retarding effect is produced by the retardation layer 45, also, and the combined effects produce the illustrated shift or displacement between the response curves 52 and 55. Electrons which are beamed upon the superposed phosphors at a higher velocity, such as that occasioned by the higher potential $E_2$, will effect substantially optimum emission from the short-record phosphor even after the aforesaid retardations have occurred, as indicated at point 56 on curve 55. At the same times the long-record phosphor may nevertheless develop a visible emission, the extent being designated by point 57 on its curve 52, which can be advantageous for purposes of this invention. The retarding effects of the inner phosphor layer and the further retardation layer beyond it are selected in relation to the highest accelerating potential such that the kinetic energy of electrons accelerated by that potential will be at least about the level appearing at point 56, which is sufficient to stimulate about optimum visible emission from the outer phosphor 40, while the lowest accelerating potential is at least about the optimum level 53 and not enough higher than that to cause any significant visible emission from phosphor 40. The needed displacements between characteristic curves for the two phosphors may result from influences other than retardation, one appropriate influence being that of the doping or "poisoning" of a phosphor with certain materials, according to techniques known in the art, to raise the level of electron velocities required for optimum emission. The latter techniques avoid need for interposing one of the phosphors in a layer as a retarding barrier for the other phosphor, and separate layers then need not be used; instead mixtures of small discrete particles of the different phosphors may be exploited in a single layer, for example.

The enlarged fragments 58 of a picture tube faceplate shown in FIGURE 4 is of a modified construction in which the needed spacings 43' for electrical isolations of adjacent strips of the screen array 34' are produced by thin glass ribs 59 formed integral with the glass faceplate 35'. Good insulation between strips is necessitated by the fact that most currently-used phosphors are somewhat conductive. Nonconductive phosphors, or other electrical insulating techniques, obviate the need for ribs 59. As a convenience, the same reference characters, with distinguishing single-prime accents added, are used to describe those portions of FIGURE 4 which are like corresponding portions of FIGURE 2.

In FIGURE 5, a preferred delay-line arrangement 60 is portrayed in association with a picture tube and color control circuitry of the type involved in practices of this invention. Double-prime accents distinguish the reference characters which identify parts which are the same as or are functionally equivalent to parts of corresponding number in the illustrations already referred to herein. Details of the phosphor layering in the strips of screen array 34″ are not reproduced in the simplified schematic illustration, although it should be understood that these would be as described in connection with FIGURES 1, 2 and 4. Delay line 38″ comprises series inductance and shunt capacitance elements forming the numerous sections (example: twenty) which are tapped in succession to the different strips of screen array 34″ via connections 46″. This is a known form of delay line, which in the past has been used for purposes alien to those of the present invention, and which is interposed between a high-voltage supply terminal 61 and the plate of a normally cut-off tube 62. Each synchronized positive pulse applied to the control grid of tube 62 from source 37″ results in a corresponding negative pulse at its plate, and it is this negative pulse which is shifted along the delay line 38″ until it reaches the output line 63. Preferably, the line 63 is not terminated in a load which will absorb and dissipate energy but, instead, in a further, auxiliary, delay line, 64, which circulates the pulse back to the input of line 38″. System power losses are minimized in this way. In terms of structure, line 64 may be similar to line 38″ in that it includes series inductance and shunt capacitor elements, although these need not be arranged in any predetermined number of like sections, nor tapped, and, for optimum feedback, the delay in line 64 should be the greater, to take into account the short re-trace blanking interval. Where alternate horizontal line scans are to be performed at the different accelerating potentials, the delay in circuit 64 may, for example, be set at 72 microseconds. Negative pulses, reinforced by feedback, are then applied to control the color response of the screen array during alternate line scans. Diode 65 assures that the pulse circulations are in but the one proper direction. When the negative pulse scans the strips of the screen array 34″, the kinetic energy of the electron beam travelling synchonously with it is relatively low, and but one of the two phosphors can be stimulated to emit substantial visible light of its distinctive wavelength. At other times during line scanning, the accelerating potential and beam kinetic energy are greater, and the other of the phosphors can then be caused to emit light of its different wavelengths. The intensities of emissions from both phosphors are of course controlled separately, by the control signals applied to the electron gun structure from chrominance control switch 36″. The latter may for example comprise two simple gating circuits, such as two amplifiers which are normally biased to cutoff which are alternately biased to gate or pass the respective red (long) and green (short) outputs from a conventional color matrix, the gating bias being conveniently taken from a flipflop circuit triggered in response to the same signals which synchonize the horizontal sweep signals. As has been noted earlier herein, the pulses applied to the target strips are preferably of trapezoidal rather than rectangular form, and source 37″ thus preferably develops trapezoidal output pulses. Corresponding pulses applied to the delay line appear in FIGURE 6. The flat peaks or tops of the pulses are of duration 66 about equal to the line-scanning interval divided by the number of target strips in the tube (example: 54 microseconds divided by 20, or 2.7 micorseconds). Sloping leading and trailing edges of these pulses may be of various durations, although the maximum total pulse duration must not exceed the line-scanning interval. Pulses 67 and 68 characterize negative pulses which may be delivered to the delay line, while pulse 69 represents a positive pulse, relative to the fixed potential level P. In some embodiments, the pulses delivered to delay line 38″ may be alternately negative and positive, as in the case of successive pulses 68 and 69.

As depicted by the front view of a fragment of picture tube faceplate 35 appearing in FIGURE 7, the electron beam 29 may conveniently produce the desired natural-color reproductions as the result of adjacent line traces in the two different wavelengths of light. Conveniently, this is possible in accordance with the customary program of interlaced scanning, whereby adjacent lines, such as lines **79*a* and 71*a***, are traced in terms of the different wavelengths of light, corresponding to the two different records being produced at the remote transmitter. The combined effects at normal viewing distances simulate the natural colors in the scene being televised. In other practices, however, precisely the same line may be scanned twice, to produce superimposed traces in accordance with each of the long and short records.

Construction of a two-color embodiment represented in the FIGURE 1 system is preferably implemented with circuitry such as appears in FIGURES 8 through 13. In this connection, the FIGURE 8 chrominance control circuitry 36 is shown to include a multivibrator 70 which, in the embodiment under discussion, generates a 7.5 kc. square-wave output needed to develop periodic variations in picture-tube brightness while color signals are being processed. By way of explanation, although luminance signals may be applied to the picture-tube gun in a generally conventional manner to develop black-and-white reproductions when no color information is present, it is found that the tube brightness level should be varied by way of grid 33, sychronously with the color changes during the different line sweeps for the "red and white" color displays, to compensate for the different signal levels developed at the picture tube cathode by the chrominance control circuitry. Appropriately, the multivibrator 70 delivers two phases of square-wave pulses in alternation, and these pulses are applied to the brightness control circuitry 28 for processing into different levels of grid bias for the picture tube. Although incorporated as part of the chrominance control circuitry unit 36 multivibrator 70 also provides a 7.5 kc. output serving as drive for the high voltage pulse source 37, via coupling 71.

Contrast control circuitry 72, within the chrominance control circuitry 36, receives red (R) and green (G) video input signals from outputs 73 and 74 of the matrixing network in chrominance and luminance circuitry 23, and functions to gate or switch these signals to the picture tube gun in sequence at the 7.5 kc. rate under control of the positive and negative multivibrator outputs appearing in couplings 75 and 76. As is shown in FIGURE 10, this gating may conveniently be achieved using transistor gates 77 and 78 one of which is in the "On" state while the other is "Off" as dictated by the incoming 7.5 kc. square waves appearing at terminals 75 and 76. Transistors 79 and 80 continuously supply red (R) and green (G) video signal information to the gating transistors 77 and 78, respectively from terminals 73 and 74 associated with circuitry 23, but the red (R) signal is passed to the sequential output lead 81 only while transistor 77 is gated "On" and the green (G) signal is passed to output lead 81 only while transistor 78 is gated "On". Variable resistances 82 and 83 serve as independent video level controls for the red (R) and green (G) channels. FIGURE 9 illustrates a suitable schematic diagram for multivibrator 70, including a pair of transistors 84 and 85, and a pair of associated steering diodes, 86 and 87, which reverse the states of the transistors each time a 15 kc. pulse is applied to the input lead 88 from a convenient site elsewhere in the receiver circuitry. The output of chrominance control circuitry 36 appearing in coupling 81 is thus readily caused to exhibit spaced (by substantially 9 microseconds) sequential video signals, each of substantially the desired 54 microseconds span, which are alternately representative of the red (R) and green (G) video information desired to excite the "red" and "white" emisisons from the picture tube 27 during the alternate line scans. These video signals are preferably amplified and DC-restored, in accordance with conventional practices, and are then played on the picture tube cathode.

Brightness control circuit 28 (FIGURE 11) takes into account the different signal levels on the cathode of the picture tube, and its output over lead 89 switches the DC level on the grid 33 of that tube to set it properly and synchronously at the same rate as the video is being switched. Resistances 90 and 91 provide the controls for setting the two output voltage levels during alternate 54-microsecond intervals separated by 9-microsecond intervals during which the voltage is set at a blanking level which causes picture tube cutoff. For these purposes, the two halves 92 and 93 of a double triode performs amplifications of the respective 7.5 kc. square-wave inputs to their grids from multivibrator 70, and the further triode 94 responds to 15 kc. control input negative pulses which may be the same as the input to lead 88 (FIGURE 9) to draw the output in lead 89 down to the desired blanking level for 9 microseconds after each 54-microsecond line-scan period has passed.

In generating the pulses needed to vary the picture-tube screen phosphor voltages at the 15 kc. line rate, it is convenient to set the DC level high enough to excite the "white" emissions, and then to send a negative pulse down the tapped delay line 38 during the times when every other "red" line is being scanned by the electron beam. A "one-shot" multivibrator 95 (FIGURES 8 and 12) including transistors 96 and 97 serves to deliver negative pulses to output lead 98 at the desired rate (example: 3-microsecond pulses repeated at 126-microsecond intervals) in response to periodic triggering by the multivibrator 70 via coupling 71. These pulses are applied to the pulse amplifier and shunt regulator unit 99 which may be of a construction as shown in FIGURE 13. Triode 100 there acts in the manner of a shunt regulator for a television high voltage flyback supply, and has its grid biased from a supply terminal 101 via a variable resistance 102 which may be used to set the desired DC level of picture-tube phosphor voltage so that it will normally tend to stimulate "white" emissions. During the 3-microsecond intervals of the negative pulses appearing in lead 98, the high voltage output in output coupling 103 is pulled down for corresponding intervals because of the cathode excitations of shunt regulator 100 by way of amplifier 106. Each such negative pulsation in the high voltage output travels down the tapped delay line 38 and is preferably retrieved by way of the auxiliary delay line 104 and diode 105. When the next-succeeding negative high-voltage pulsation occurs at the plate of triode 100, the retrieved pulse reinforces it in synchronism.

Those skilled in the art will perceive that more than one delay line may be used with a single picture tube and that, for example, different delay lines may be employed to handle separately alternate positive and negative color modulating pulses if both are developed in one system. The delay line sections themselves may be of forms other than that illustrated, and the auxiliary delay line used to achieve regenerative feedback may of course be of wholly different form from that of the tapped lines by which the target strips are scanned. In producing substantially natural color with but two phosphors, such as those emitting red and green-blue light, it is known that these may be excited separately, in response to the two different records developed at the television camera, or alternatively, they may both be excited into emissions representing one record while only one is excited into emissions representing the other record. Adaptations of these teachings to the productions of displays in three colors are also within the purview of this invention. In lieu of phosphors themselves emitting characteristically different wavelengths of light, color filters may be used, such as the filter produced by a thin metallic gold layer or the like. A mosaic-type target involving dots or spots of the different phosphors will produce useful results, although layers are currently preferred, and in any event there is no critical registration and masking problem such as exists with known three-color multi-gun picture tubes. The target phosphors utilized in practice of this invention obviously may be of the same types and compositions as those which have been exploited heretofore in color television apparatus, such as the phosphors used in conventional three-color picture tubes. Among these are the red-emitting phosphor $Zn_3(PO_4)_2$:Mn, the blue-emitting phosphor ZnS:Ag:MgO, and the green-emitting phosphor millemite ($Zn_2SIO_4$:Mn), and others known in the art.

What we claim as new and desire to secure by Letters Patent of the United States is:

1. Apparatus for producing displays in color from electrical input signals characterizing a televised subject, comprising cathode ray tube means including a target assembly emitting visible light the content of which includes different wavelengths responsive to impingements thereon of electrons having different kinetic energies, means for scanning said target assembly with electrons in one direction thereacross, said target assembly being divided into a plurality of electrically-conductive parallel strips which are spaced for electrical isolation from one another and which are substantially perpendicular to said direction, and means applying a pulse of accelerating voltage sequentially to successive ones of said strips in said direction substantially in synchronism with the scanning by said beam.

2. Apparatus for producing displays in color as set forth in claim 1 wherein said strips are narrow but of width greatly in excess of the cross-section of said beam, and wherein the spacing between said trips is minute and substantially indistinguishable at normal viewing distances.

3. Apparatus for producing displays in color from electrical input signals characterizing a televised subject, comprising cathode ray tube means including a target assembly emitting visible light the content of which includes different wavelengths responsive to impingements thereon of electrons having different kinetic energies, means for scanning said target assembly with electrons in one direction thereacross, accelerating anode means comprising a plurality of electrically-conductive parallel strips spaced from one another and arranged side-by-side in substantially perpendicular relation to said direction at substantially the position of said target assembly, and means for changing the kinetic energies of electrons impinging on said target assembly by applying pulses of accelerating voltage sequentially to successive ones of said strips in said direction substantially in synchronism with the scanning by said beam.

4. Apparatus for producing displays in color from electrical input signals characterizing a televised subject, comprising cathode ray tube means including a target assembly emitting visible light the content of which includes different wavelengths responsive to impingements thereon of electrons having different kinetic energies, means for scanning said target assembly with electrons in one direction thereacross, said target assembly being divided into a plurality of electrically-conductive parallel strips which are spaced for electrical isolation from one another and which are substantially perpendicular to said direction, delay line means having a plurality of electrical delay sections the successive ones of which are connected to different ones of said strips, in succession in said direction, and means applying a pulse of accelerating voltage to said delay line means substantially in synchronism with commencement of scan in said direction by said scanning means to cause said pulse of accelerating voltage to sweep across said target assembly in said one direction synchronously with the scanning of said target assembly by said electrons.

5. Apparatus for producing displays in color as set forth in claim 4 wherein said scanning means includes anode means applying a substantially fixed potential to accelerate said electrons into the vicinity of said target assembly with a predetermined kinetic energy, and wherein said pulse of accelerating voltage changes the accelerating voltages at said strips and thereby changes the kinetic energy of said electrons which reach said strips from said predetermined kinetic energy to a different net kinetic energy.

6. Apparatus for producing displays in color as set forth in claim 5 wherein said predetermined kinetic energy of said electrons is sufficient to excite said target assembly into emissions of visible light of all of said wavelengths, and wherein said pulse is negative in relation to said fixed potential and thereby changes said kinetic energy to a net kinetic energy lower than said predetermined kinetic energy and sufficient to excite said target assembly into emissions of visible light having less than all of said wavelengths.

7. Apparatus for producing displays in color from electrical input signals characterizing a televised subject, comprising cathode ray tube means including a target assembly emitting visible light the content of which includes different wavelengths responsive to impingements thereon of electrons having different kinetic energies, means for scanning said target assembly with electrons horizontally to trace horizontal lines of said displays thereacross, said target assembly being divided into a plurality of electrically-conductive parallel strips which are spaced for electrical isolation from one another and which are substantially vertical, delay line means having a plurality of electrical delay sections the successive ones of which are connected to different ones of said strips, in succession horizontally, means applying a pulse of accelerating voltage to said delay line means substantially in synchronism with commencement of trace of a horizontal line by said scanning means, and means recirculating said pulse through said delay-line means in synchronism with other pulses applied to said delay-line means by said pulse applying means.

8. Apparatus for producing displays in color as set forth in claim 7 wherein said recirculating means comprises a delay line applying the output of said delay-line means to the input thereof after a delay equal to the duration of a horizontal line trace interval plus the horizontal blanking interval for said cathode ray tube means, and wherein said pulse applying means applies a pulse to said delay-line means at the commencement of each alternate trace of a horizontal line by said scanning means.

9. Color television receiver apparatus for producing displays in color from electrical input signals characterizing different records of a televised subject each representing different visible-wavelength contents of light in the subject, comprising cathode ray tube means including a target assembly and means for scanning said target assembly with an electron beam to trace horizontal lines of said displays, said target assembly comprising at least first means including phosphor for emitting visible light having a first wavelength content responsive to impingement thereon of electrons having at least a first kinetic energy and second means including phosphor for emitting visible light having a second wavelength content substantially in optical registration with said visible light of said first means responsive to impingements thereon of electrons having at least a second kinetic energy, said target assembly being divided into a plurality of electrically-conductive vertical strips which are electrically isolated from one another, delay-line means having a series of electrical delay sections each connected to a different one of said vertical strips in succession in the horizontal direction, and means for applying a pulse of acecelerating voltage to said delay-line means substantially in synchronism with horizontal line scanning by said beam to cause said pulse of accelerating voltage to sweep across said target assembly synchronously with the horizontal scanning of said target assembly by said electrons.

10. Color television receiver apparatus as set forth in claim 9 wherein each of said sections of said delay-line means includes series inductive and shunt capacitive reactances, and wherein each of said vertical strips is of substantially one width greatly in excess of the cross-section of said electron beam.

11. Color television receiver apparatus as set forth in claim 10 wherein said reactances in each of said sections produce a time delay of said pulse substantially equal to the horizontal line-scanning interval for said apparatus divided by the number of said vertical strips.

12. Color television receiver apparatus for producing displays in color from electrical input signals characterizing different records of a televised subject each representing different visible-wavelength contents of light in the subject, comprising cathode ray tube means including a target assembly and means for scanning said target assembly with an electron beam to trace horizontal lines of said displays, said target assembly comprising at least first means including phosphor for emitting visible light having a first wavelength content responsive to impingement thereon of electrons having at least a first kinetic energy and second means including phosphor for emitting visible light having a second wavelength content substantially in optical registration with said visible light of said first means responsive to impingements thereon of electrons having at least a second kinetic energy, said target assembly being divided into a plurality of electrically-conductive tive vertical strips which are electrically isolated from one another, delay-line means having a series of electrical delay sections each connected to a different one of said vertical strips in succession in the horizontal direction, and means for applying a pulse of accelerating voltage to said delay-line means substantially in synchronism with horizontal line scanning by said beam to cause said pulse of accelerating voltage to sweep across said target assembly synchronously with the horizontal scanning of said target assembly by said electrons, each of said vertical strips being about an inch wide, adjacent ones of said vertical strips being spaced apart by up to about ten thousandths of an inch, and the leading and trailing edges of said pulses being of relatively long duration to suppress tendencies toward voltage breakdowns between adjacent ones of said strips.

13. Color television receiver apparatus for producing displays in color from electrical input signals characterizing different records of a televised subject each representing different visible-wavelength contents of light in the subject, comprising cathode ray tube means including a target assembly and means for scanning said target assembly with an electron beam to trace horizontal lines of said displays, said target assembly comprising at least first means including phosphor for emitting visible light having a first wavelength content responsive to impingement thereon of electrons having at least a first kinetic energy and second means including phosphor for emitting visible light having a second wavelength content substantially in optical registration with said visible light of said first means responsive to impingements thereon of electrons having at least a second kinetic energy, said target assembly being divided into a plurality of electrically-conductive vertical strips which are electrically isolated from one another, delay-line means having a series of electrical delay sections each connected to a different one of said vertical strips in succession in the horizontal direction, means for applying a pulse of accelerating voltage to said delay-line means substantially in synchronism with horizontal line scanning by said beam to cause said pulse of accelerating voltage to sweep across said target assembly synchronously with the horizontal scanning of said target assembly by said electrons, said pulse applying means applying said pulse to said delay-line means in synchronism with commencement of each alternate horizontal line scan by said scanning means, and a delay line recirculating the output of said delay-line means back to the input thereof after a delay equal to the interval of each horizontal scan plus a horizontal blanking interval for said cathode ray tube, whereby the recirculated pulses augment the pulses from said pulse applying means and thereby conserve power in said apparatus.

14. Color television receiver apparatus as set forth in claim 13 wherein said cathode ray tube means includes accelerating anode means near said target assembly applying a substantially fixed potential to accelerate said electrons into the vicinity of said target assembly with a predetermined kinetic energy, and wherein said pulse of accelerating voltage changes the kinetic energy of the electrons which reach said strips from said predetermined kinetic energy to different kinetic energy.

15. Color television receiver apparatus as set forth in claim 14 wherein one of said first and second means emits substantially reddish light and the other emits substantially green-blue light in response to impingements of said electrons thereon, and wherein said pulse of accelerating voltage changes the kinetic energy of electrons impinging on said phosphors from one to the other of said first and second kinetic energies.

16. Color television receiver apparatus as set forth in claim 14 wherein said pulse applying means applies positive and negative pulses to said delay-line means in alternation, said positive pulses raising the kinetic energy of said electrons to at least one energy level required to cause emission of light by at least one of said first and second means, and said negative pulses lowering the kinetic energy of said electrons to a second energy level sufficient to cause emission by the other of said first and second means but insufficient to cause emission by said one of said first and second means.

References Cited

UNITED STATES PATENTS

| | | | |
|---|---|---|---|
| 2,886,731 | 5/1959 | Zappacosta | 178—5.4 XR |
| 3,242,260 | 3/1966 | Cooper et al. | 178—5.4 |
| 3,284,662 | 11/1966 | Kagan | 178—5.4 XR |

ROBERT L. GRIFFIN, *Primary Examiner.*

RICHARD MURRAY, *Assistant Examiner.*